Sept. 15, 1959 K. C. BUGG 2,904,745
METHOD AND APPARATUS FOR THE ORIENTATION OF MAGNETIC CORES
Filed Feb. 17, 1956
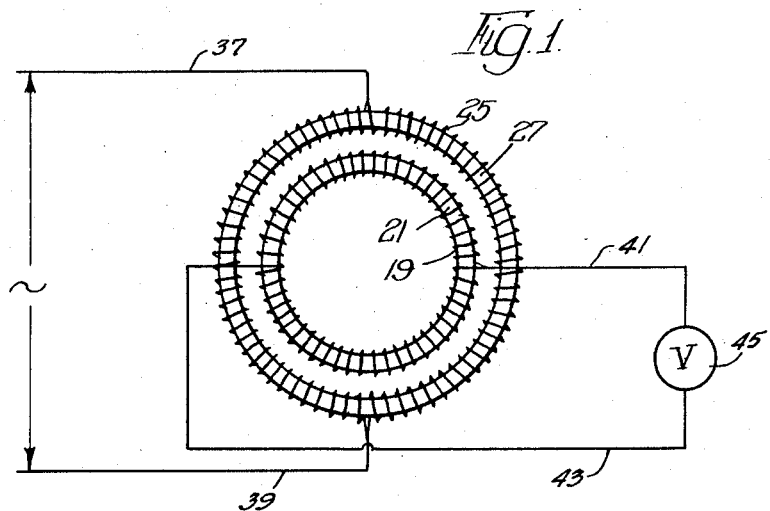
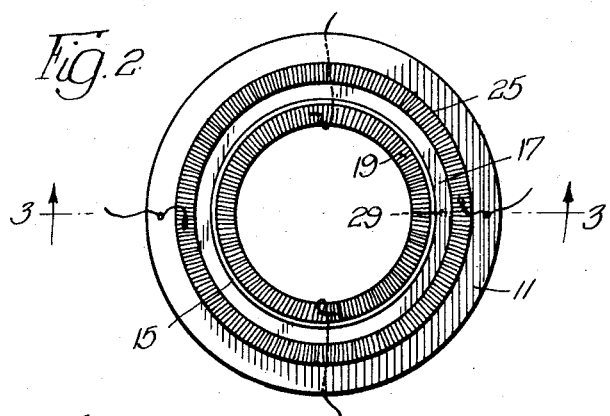
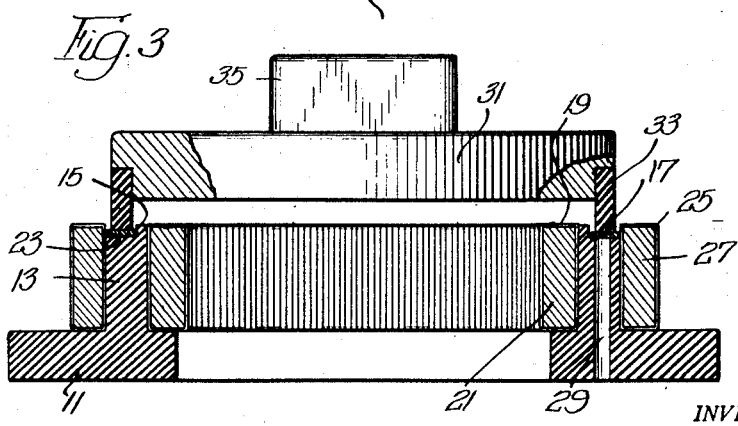
INVENTOR.
Kenly C. Bugg,
BY `# United States Patent Office

2,904,745
Patented Sept. 15, 1959

2,904,745

METHOD AND APPARATUS FOR THE ORIENTATION OF MAGNETIC CORES

Kenly C. Bugg, Fort Wayne, Ind., assignor to Kendick Manufacturing Company, Inc., Fort Wayne, Ind., a corporation of Indiana Application February 17, 1956, Serial No. 566,263

11 Claims. (Cl. 324—14)

This invention relates to a new and improved method and apparatus for the orientation of magnetic cores or core materials for use in electrical apparatus.

While the method and apparatus are adapted for use with the cores of various types of apparatus, it is of particular use in connection with apparatus which requires very accurate location of the magnetic poles of the coils wound on such cores. Examples of such apparatus are the stators and rotors of synchronous motors used for indicating or control purposes, such motors being designated by the Navy Department as "synchros." Other examples are deflection yokes or coils used for the control of electron beams in cathode-ray tubes.

For such uses it has heretofore been the general practice to use laminated cores formed of thin layers of special steels. The sheets of steel are given special rolling treatments to orient the grain structure and the magnetic polarity. Such steels are expensive and large quantities would be difficult or impossible to procure in an emergency when suddenly expanded production of this type of equipment may be required.

My present invention permits the use in such equipment of standard core steels in general production for use in transformers and motors, which steels are readily obtainable in large quantities at low cost.

It is an object of the present invention to provide new and improved methods of magnetically orienting cores or laminations for use in cores of electrical equipment.

It is a further object to provide methods and apparatus by means of which standard core steels may be used in instruments requiring great accuracy of polar orientation of cores and the windings applied thereto.

It is an additional object to provide a method which is simple and may be rapidly carried out by relatively unskilled personnel.

It is also an object to provide apparatus which is simple in design and construction and adapted for commercial production and use.

Other and further objects will appear as the description proceeds.

I have shown certain preferred embodiments of my invention in the accompanying drawings, in which—

Figure 1 is a circuit diagram illustrating the manner in which the apparatus is hooked up to carry out the tests;

Figure 2 is a plan view of the apparatus with the upper member removed; and

Figure 3 is an elevation, partly in section, on an enlarged scale, of the apparatus.

The apparatus comprises a base member 11 formed of insulating material and having an upstanding circular flange 13. The upper face of flange 13 is provided with a small circular locating flange 15 which serves to positively locate the core ring 17 being tested. The flange 15 protects the coil 19 on ring core 21 from contact with the core or core lamination 17. The width of the bearing surface 23 of flange 13 is such that the outer edge of the lamination 17 does not engage the coil 25 wound on core 27. The base member 11 is provided with one or more perforations 29 by means of which a tool may be thrust upwardly to eject the lamination 17 after test. The rotating member 31 has a disc having a circumferential contact flange 33 extending downwardly to engage the upper face of the core or lamination 17. The handle 35 is provided for rotation of the disc member 31. The member 31 will be formed of non-magnetic material and the member 33 may be formed of suitable material such as rubber or similar plastics which will afford a proper frictional engagement with the core or lamination 17 so that with slight pressure on member 31 rotation of that member will rotate the core or lamination.

Referring now to the diagram of Figure 1, the winding 25 on the outer core 27 comprises two 180° windings with the adjacent ends of the windings connected to the power leads 37 and 39 which serve to provide a source of alternating current. The inner core 21 is provided with similar split windings 19 which are connected through leads 41 and 43 to a vacuum tube volt meter 45. In assembling the machine, the outer winding and core 25 and 27 are assembled on the base 11, as shown in Figure 3, and fixed positively in place. The inner core 21 with its winding 19 connected as shown are inserted loosely into place and the source of alternating current is connected to the leads 37 and 39. The inner member is then rotated slightly in either direction until a null reading is obtained on the volt meter 45. This inner winding is then permanently secured in this position.

The core to be tested or lamination to form such a core is then placed in position as shown in Figure 3. The disc 31 is placed on top of the core or lamination as shown. By means of the finger piece 35, this member 31 is rotated and such rotation serves to rotate the core or lamination. This manual rotation takes place while watching the indication on the volt meter 45 and when the lowest null is reached on the volt meter the core or lamination is suitably marked to show its electrical pole. This mark serves to properly locate the core or lamination so that when placed in the winding machine it is oriented so that the pole of a winding coincides with the pole of the core or any selected relationship of core pole and winding may be used. It will be understood that if a plurality of laminations are individually oriented by the use of the apparatus they will be assembled into a core with their whole markings superposed one upon another. It is further to be understood that either laminations or cores when tested will ordinarily be rotated several times in the same direction in the machine as there may be one or more oriented positions in which low readings will appear on the meter and normally the position at which the lowest reading appears will be selected. It has been found important in testing a core that the rotation always be made in the same direction to avoid errors. The core thus oriented may be used for any purpose as for example as a stator or rotor core or a core for a toroidal inductance.

The combination of a carefully and accurately wound coil wound in a correct orientation upon a core whose pole has been located results in an extremely accurate iron ore coil assembly. The coils may be wound accurately upon the apparatus shown in my copending application Serial No. 296,784, filed July 2, 1952, now Patent No. 2,757,873. Normally cores 21 and 27 will be formed by spirally winding very thin flat ribbons of suitable magnetic material. For the utmost accuracy in this apparatus, these cores should be oriented and the cores wound thereon accurately with the machine disclosed in my copending application. This combination will give an extremely accurate reading apparatus by the use of which the proper orientation of cores for future coils may be determined.

The particular form of apparatus shown is adapted for use with a flat toroidal core or core lamination. It is to be understood that the machine may be modified for use with any size or configuration of core which is toroidal in over-all shape. The apparatus and method are also capable of further variations to meet differing conditions and requirements and I, therefore, contemplate such modifications as come within the spirit and scope of the appended claims.

I claim:

1. Apparatus for orienting toroidal cores including a toroidal transformer comprising a primary winding on a toroidal core of magnetic material, a secondary winding on a second toroidal core of magnetic material spaced from the first-mentioned core, the two cores having a common axis, leads for connecting a source of alternating current to the primary winding, and leads for connecting a voltmeter across the secondary winding.

2. Apparatus for orienting toroidal cores including a toroidal transformer comprising a primary winding on a toroidal core of magnetic material, leads for connecting the winding at points spaced 180° to a source of alternating current, a secondary winding on a second toroidal core of magnetic material, said cores and windings being spaced apart, leads extending from points spaced 180° apart on the secondary winding and a voltmeter connected across the leads from the secondary winding.

3. Apparatus for orienting toroidal cores including a toroidal transformer comprising a primary winding on a toroidal core of magnetic material, leads for connecting the winding at points spaced 180° to a source of alternating current, a secondary winding on a second toroidal core of magnetic material, said windings being spaced apart, leads extending from points spaced 180° apart on the secondary winding, a voltmeter connected across the leads from the secondary winding, the windings being positioned relative to each other so that the primary lead connections make angles of substantially 90° with the secondary lead connections to give a minimum reading on the voltmeter when alternating current is supplied to the primary.

4. Apparatus for orienting toroidal cores including a toroidal transformer comprising a primary winding on a cylindrical toroidal core of magnetic material, a secondary winding on a second cylindrical toroidal core of magnetic material, one of said windings and core being of lesser diameter than the other, means for mounting the windings concentrically one within the other in spaced relation, leads for connecting a source of alternating current to the primary coil, said leads being connected to the coil at points spaced 180°, and leads connected to the secondary coil at points spaced 180° for connecting the secondary coil to a voltmeter.

5. Apparatus for orienting toroidal cores including a toroidal transformer comprising a primary winding on a cylindrical toroidal core of magnetic material, a secondary winding on a second cylindrical toroidal core of magnetic material, one of said windings and core being of lesser diameter than the other, means for mounting the windings concentrically one within the other in spaced relation, leads for connecting a source of alternating current to the primary coil, said leads being connected to the coil at points spaced 180°, leads connected to the secondary coil at points spaced 180° for connecting the secondary coil to a voltmeter, the windings being positioned relative to each other so that the primary lead connections make angles of substantially 90° with the secondary lead connections to give a minimum reading on a voltmeter when alternating current is supplied to the primary.

6. Apparatus for orienting toroidal cores including a toroidal transformer comprising a primary winding on a toroidal core and a secondary winding on a second toroidal core spaced therefrom, means for connecting a source of alternating current to the primary winding, and a voltmeter connected to the secondary winding, and means for supporting a core to be tested between the primary and secondary windings.

7. Apparatus for orienting toroidal cores including a toroidal transformer comprising a primary winding on a toroidal core of magnetic material, a secondary winding on a second toroidal core of magnetic material spaced from the first-mentioned core, the two cores being concentrically located, leads for connecting a source of alternating current to the primary winding, leads for connecting a voltmeter across the secondary winding, means for supporting a core to be tested between the primary and secondary windings, and means for rotating a core on the support means.

8. The method of orienting a toroidal magnetic core which comprises placing the core in the field between the primary and secondary toroidal windings of a transformer, said windings being located on separate toroidal cores, supplying alternating current to the primary of the transformer, connecting a voltmeter across the secondary of the transformer, and rotating the core about the axis of the transformer windings to locate the position of minimum voltmeter reading.

9. The method of orienting a toroidal magnetic core which comprises placing the core in the field between the primary and secondary toroidal windings of a transformer, said windings being located on separate toroidal cores, supplying alternating current to the primary of the transformer, connecting a voltmeter across the secondary of the transformer, rotating the core about the axis of the transformer windings to locate the position of minimum voltmeter reading, and placing an indicating mark on the core to designate its relationship to the transformer polar axis.

10. The method of orienting a toroidal magnetc core which comprises connecting a source of alternating current to the primary of a toroidal transformer, connecting a voltmeter across the secondary of the toroidal transformer, rotating the secondary relative to the primary of the transformer to produce a minimum reading on the voltmeter, placing the core to be tested in the field between the primary and secondary, and rotating the core about the axis of the transformer to a position giving a minimum reading on the voltmeter.

11. The method of orienting a toroidal magnetic core which comprises connecting a source of alternating current to the primary of a toroidal transformer, connecting a voltmeter across the secondary of the toroidal transformer, rotating the secondary relative to the primary of the transformer to produce a minimum reading on the voltmeter, placing the core to be tested in the field between the primary and secondary, rotating the core about the axis of the transformer to a position giving a minimum reading on the voltmeter, and placing an indicating mark on the core to designate its relationship to the polar axis of the transformer primary.

References Cited in the file of this patent

UNITED STATES PATENTS

| | | |
|---|---|---|
| 1,459,970 | Burrows | June 26, 1923 |
| 1,599,645 | Burrows | Sept. 14, 1926 |
| 2,566,140 | Petch | Aug. 28, 1951 |
| 2,574,795 | Miller | Nov. 13, 1951 |